(12) United States Patent
Brown et al.

(10) Patent No.: US 6,482,484 B1
(45) Date of Patent: Nov. 19, 2002

(54) POLY(1,3 PROPANEDIOL TEREPHTHALATE) FOR USE IN MAKING PACKAGING MATERIALS

(75) Inventors: Michael Joseph Brown, Wilmington, DE (US); Benjamin Andrew Smillie, Kingston (CA); Donna Lynn Visioli, Lower Gwynedd, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/587,886

(22) Filed: Jun. 6, 2000

Related U.S. Application Data
(60) Provisional application No. 60/137,923, filed on Jun. 7, 1999.

(51) Int. Cl.$^7$ .................................................. B32B 1/00
(52) U.S. Cl. ..................... 428/35.8; 428/35.7; 428/480; 524/394; 524/413; 524/451; 525/177; 525/444
(58) Field of Search ............................... 428/35.7, 35.8, 428/480; 525/444, 177; 524/394, 413, 451

(56) References Cited

U.S. PATENT DOCUMENTS

| | | |
|---|---|---|
| 6,245,844 B1 | 6/2001 | Kurian et al. |
| 6,331,344 B1 * | 12/2001 | Okazaki ...................... 428/141 |

FOREIGN PATENT DOCUMENTS

| | | | |
|---|---|---|---|
| EP | 0 943 428 A1 | 9/1999 | ........... B32B/27/36 |
| WO | WO 95/02641 | 1/1995 | ........... C08L/67/02 |
| WO | WO99/17931 | 4/1999 | ........... B32B/27/36 |

* cited by examiner

*Primary Examiner*—Patricia A Short

(57) ABSTRACT

This invention relates to a non-flavor scalping, extrusion coating resin comprising poly(1,3-propanediol terephthalate) homopolymer or copolymer of 1,3-propanediol, terephthalic acid and isophthalic acid, as well as a nucleation promoter. The invention also comprises a non-flavor scalping extrusion coated package, e.g., a carton or can.

11 Claims, No Drawings

POLY(1,3 PROPANEDIOL TEREPHTHALATE) FOR USE IN MAKING PACKAGING MATERIALS

This application claims the benefit of U.S. Provisional Application No. 60/137,923 filed Jun. 7, 1999.

FIELD OF THE INVENTION

This invention relates to poly(1,3 propanediol terephthalate), referred to as 3GT or PPT, for use in making packaging materials. In particular, the present invention relates to 3GT and its copolymers that have an excellent combination of barrier, mechanical, thermal and rheological properties and are particularly suitable for use in the packaging of foodstuffs, cosmetics and pharmaceutical products.

BACKGROUND OF THE INVENTION

3GT is also known as poly(1,3 propylene terephthalate), PPT or PTMT. Generally, it is made by reacting 1,3 propanediol with terephthalic acid or a lower dialkyl ester of terephthalic acid, with the subsequent polymerization of the monomer produced. Thus, as used in this specification, 3GT refers to poly(1,3 propanediol terephthalate) which may be modified with small amounts, less than 10 mole percent, of polymer repeat units derived from copolymerized monomers (or co-repeat units), so long as the crystallization behavior of the polyester is substantially the same as the "homopolymer" 3GT.

SUMMARY OF THE INVENTION

This invention provides a non-flavor scalping, extrusion coating resin comprising:
  a. a polyester selected from poly(1,3 propanediol terephthalate) and a copolymer of 1,3 propanediol and up to about 20% by weight comonomers, and
  b. a nucleation promoter selected from the group consisting of titanium dioxide, talc, amorphous silica, linear low density polyethylene, polypropylene, sodium acetate, sodium endcapped poly(ethylene terephthalate) and sodium endcapped poly(1,3 propanediol terephthalate).

The invention also provides a non-flavor scalping, extrusion coated package, comprising:
  a. a backing layer, and
  b. a film layer on at least one side of the backing layer, the film layer comprising:
    i. a polyester selected from poly(1,3 propanediol terephthalate) and a copolymer of 1,3 propanediol and up to about 20% by weight comonomers, and
    ii. a nucleation promoter selected from the group consisting of titanium dioxide, talc, amorphous silica, linear low density polyethylene, polypropylene, sodium acetate, sodium endcapped poly(ethylene terephthalate) and sodium endcapped poly(1,3 propanediol terephthalate).

DETAILED DESCRIPTION OF THE INVENTION

The present invention encompasses compositions comprising 3GT and copolymers of 3GT formed by acid modification and/or glycol modification. For example, copolymer of 3GT and isophthalic acid (referred to in this specification as 3GT/I) or copolymer of 3GT and ethylene glycol and/or cyclohexane dimethanol (CHDM). The 3GT and/or 3GT copolymer compositions of the present invention are used to make packaging materials. The 3GT and/or 3GT copolymer generally comprise terephthalate and isophthalate moieties. By terephthalate moiety, it is meant the ester unit or part of the polyester based on or derived from terephthalic acid or its equivalent; by isophthalate moiety it is meant the ester unit or part that is based on or derived from isophthalic acid or its equivalent. The polyol might include copolymers with ethylene glycol or CHDM.

3GT and 3GT copolymers (e.g., 3GT/I) serve as excellent starting materials for making packages, such as thermoformed articles, film, sheet and multi-layer articles. For industrial and medical packaging applications, polystyrene has been found to be too brittle and PET is too difficult to cut (with steel rule dies). Thus, polyvinylchloride sheet, and to a lesser extent PETG have been used, however there are health and environmental concerns with the use of PVC. 3GT and 3GT copolymers, particularly 3GT/I, with a relatively lower modulus provide a more environmentally friendly alternative.

In particular, this invention relates to the use of 3GT and/or 3GT/I for making non-flavor scalping, extrusion coating resin, that can be easy to seal depending on the end use requirements.

In the 3GT and 3GT/I of the present invention, a nucleation promoter is added to provide acceptable end use properties. Suitable nucleation promoters include, but are not limited to finely dispersed inorganic particles (examples include titanium dioxide, talc, and amorphous silica), non-miscible polymers such as linear low density polyethylene and polypropylene, miscible polyester-based compounds (examples include alkali metal salts of polyesteroligomers), alkalimetal salts of hydrocarbon carboxylic acids and sodium dicarboxylates. Preferred nucleation promoters include organic sodium salts such as sodium acetate, sodium endcapped poly(ethylene terephthalate) and sodium endcapped 3GT since these will minimize opacity.

The starting material necessary for forming the 3GT employed in the practice of this invention is terephthalic acid or an ester-forming derivative thereof. Suitable derivatives, for example, include dialkyl esters and diacylates of terephthalic acid. Among these compounds, terephthalic acid and dialkyl esters thereof are preferable, with dimethyl terephthalate being particularly preferable.

The diol necessary for forming the 3GT resin according to the present invention is 1,3-propanediol. The polyester resin to be used in the present invention includes not only 3GT homopolymers made essentially from those starting materials as described above, but also 3GT copolymers each comprising 3GT units in an amount of at least 80 mole % based on the entirety of the repeating units in the polymer chain. Suitable comonomers that may be employed include monobasic and polybasic carboxylic acids and derivatives thereof, hydroxy carboxylic acids and derivatives thereof, monohydric and polyhydric phenols and derivatives thereof, monohydric and polyhydric aliphatic (including alicyclic) alcohols and derivatives thereof, hydroxy amines and derivatives thereof, mono- and poly-amides and derivatives thereof, isocyanates and derivatives thereof, and isocyanurates and derivatives thereof. These comonomers may be used alone or as a mixture of two or more of the same.

Specific examples of the dibasic carboxylic acids include aromatic dicarboxylic acids such as isophthalic, orthophthalic, diphenic and 2,6-naphthalenedicarboxylic acids; aliphatic dicarboxylic acids such as adipic, glutaric and sebasic acids; and alicyclic dicarboxylic acids such as 1,4-cyclohexanedicarboxylic acid. Examples of the dibasic carboxylic acid derivatives include dialkyl esters and diacylates of dibasic carboxylic acids, which may be used alone or as a mixture of two or more of the same. Among these derivatives, dialkyl esters are preferred with dimethyl esters being particularly preferable.

Dihydric phenols that may be used include aromatic dihydric phenols such as hydroquinone, 2,2-bis(4-hydroxyphenyl) propane, bis(4-hydroxyphenyl) sulfone, 4,4-diphenol, 4.4'-[1,4-phenylenebis(1-methylethylidene)] bisphenol, bis(4-hydroxyphenyl) ether and 2,6-dihydroxynaphthalane. Examples of the dihydric phenol derivatives include adducts of dihydric phenols with two to four ethylene oxide molecules or two propylene oxide molecules. Adducts with two ethylene oxide molecules are particularly preferred.

Specific examples of dihydric alcohols include aliphatic diols such as ethylene glycol, 1,4-butanediol, 1,5-pentanediol, neopentyl glycol, 1,6-hexanediol and 1,10-decanediol; and alicyclic diols such as 1,4-cyclohexanediol, 1,4-cyclohexanedimethanol (CHDM) and tricyclodecanedimethanol.

One or more compounds selected from among trifunctional and higher compounds, such as trimethyl trimesate, trimethyl trimellitate, trimethylolpropane and pentaerytritol, and monofunctional compounds, such as stearyl alcohol and methyl o-benzoylbenzoate, may be used in the preparation of the polyester in such an amount as to promote the formation of a substantially linear copolymer. Furthermore, a small amount of a polyalkylene glycol, such as polybutylene glycol, may also be used to impart elasticity to the resulting resin.

A 3GT copolymer as contemplated by the present invention, may include at least one co-monomeric diacid, typically an aliphatic or aromatic dicarboxylic acid, preferably in an amount of from about 0.1 to 30 wt. % of the total acid units.

Beneficially, in accordance with one aspect of the present invention, 3GT can be modified by the incorporation of a branching agent, for example an ethoxylated, polyol. Typically, the average number of alkoxy moieties per polyol will be in the range of about 3 to 20, and may be for instance, 3, 10, 12 or 16. Alkoxylation is measured by an average number for the reason that some alkoxylated polyols in a batch will have a lesser degree of alkoxylation while other polyols in the batch will have a greater degree of alkoxylation. Thus, alkoxylated polyols useful in the present invention may be envisioned as having single alkoxy group-containing chains or multiple alkoxy group-containing chains.

The amount of the alkoxylated polyol additive to be used will, of course, depend upon the particular alkoxylated polyol selected, taking into account the average number of alkoxy moieties per polyol molecule, the particular 3GT to be produced, the advantage desired, and the intended processing application of the modified 3GT.

Lastly, the 3GT or 3GT copolymers of the present invention are characterized by glass transition temperatures, measured by differential scanning calorimetry (DSC), less than 65° C., and therefore they are in line with the thermal behavior that is generally considered as sufficient for many applications.

The 3GT and 3GT/I polyesters of the invention can also contain one or more additives such as dyes, pigments, plasticizers, antioxidants, stabilizers, tougheners, etc., utilized in the amounts generally known in the art. Said additives can be added either directly to the reaction mixture or to the final polymer.

Non-Flavor Scalping Coating:

In one aspect of the present invention, there is provided a non-flavor scalping extrusion coating resin. The resin may be heat sealable for laminating onto a substrate, though may not necessarily need to be heat sealable for some applications. These coatings are useful for making, among other things, containers or cartons for citrus juices and other liquids. The coating is a film layer of 3GT or 3GT copolymer to enhance the barrier properties of the laminate. The film layer can be extrusion coated on paper (foil or board) to provide improved moisture and oxygen barrier properties, and better, easier heat sealing capabilities.

The invention also provides a non-flavor scalping, extrusion coated package. The package material comprises a backing layer, e.g., paper, foil or board, and a film layer. The film layer may be coated on one or both sides of the backing layer. The film layer may comprise poly(1,3 propanediol terephthalate) homopolymer or a copolymer of 3GT, preferably a copolymer of 1,3 propanediol, terephthalic acid and isophthalic acid, ethylene glycol and/or CHDM, more preferabaly a copolymer of 1,3 propanediol, terephthalic acid and isophthalic acid. Additionally the film layer comprises a nucleation promoter selected from the group consisting of titanium dioxide, talc, amorphous silica, linear low density polyethylene, polypropylene, sodium acetate, sodium endcapped poly(ethylene terephthalate) and sodium endcapped poly(1,3 propanediol terephthalate).

The film layer is suitable for use on metal, steel and/or aluminum, for use in cans or can ends. This end use is described in U.S. Pat. No. 5,919,517, incorporated by reference herein. The present invention offers improved cutting and trimming compared to the disclosed coatings. The invention offers improved adhesion to metal in some compositions. The structure is suitable for use in formed packages and is environmentally friendly. The expected advantages of the resin coating herein for use on metal, steel and/or aluminum is enhanced adhesion to the foil or steel, and a reduced tendency to leave rough edges, i.e., feathering, when die cut.

When coating on metal, steel or aluminum, the film layer preferably additionally comprises a branching agent and a decomposition products scavenger. Also the polymer is preferably a 3GT copolymer with up to about 20% ethylene glycol, about 20% isophthalic acid, or up to 20% of a combination of the two. Conventional tougheners are expected to be useful in such a composition.

Suitable decomposition products scavengers are disclosed in copending, commonly-assigned patent application Serial No. 09/505,785. Decomposition products scavengers address the problem with 3-Hydroxypropanoxy terminated polymers, i.e., those polymers bearing an end group of the structure —O—$CH_2CH_2CH_2OH$; they are prone to degradative processes when molten that result in the generation and emission of acrolein, $CH_2$=CHCHO. 3-Hydroxypropanoxy terminated polymers comprise those polymers prepared from 1,3-propanediol or its chemical equivalents.

As disclosed, suitable decomposition products scavengers are melt stable, organic nitrogen-containing stabilizing compounds with which a 3-hydroxypropanoxy terminated polymer is intimately blended and is selected from melt stable primary, secondary and tertiary amines, either aliphatic or aromatic, and aliphatic or aromatic amides. Also included are polymers containing such functional groups either as a polymer side chain or in the polymer backbone, e.g., polyamides, and copolymers and blends of polyamides.

When polyamides are employed, they can be linear or branched in chain structure. Examples of linear polyamides include, monomeric polyamides, such as poly(caprolactam), nylon 6, and bis monomeric polyamides, such as poly (hexamethylenediamine adipate), nylon 4,6, nylon 6,6, nylon 6,10, nylon 6,12 nylon 12,12, or their copolymers and blends. Certain aromatic polyamides, for example poly(p-phenylene terephthalamide) and poly(m-phenylene isophthalamide), can also be employed. Polyamides prepared from the use of branched amines such as bis (hexamthylenetriamine) or BHMY can also be used.

To reduce the emission of acrolein from the 3-hydroxypropanoxy terminated polymer, it is only necessary that the decomposition products scavenging compound contain nitrogen and be stable in the polymer melt. Typically, the compound is of sufficient molecular weight so as to achieve stability in molten 3-hydroxypropanoxy terminated polymer. The scavenging compound should also not introduce or cause color in the polymer. Polyamides such as described above fulfill all of these characteristics and thus are a preferred class of decomposition products scavenging compounds.

PET is well known to be a component of current paperboard citrus juice cartons. PET provides a barrier to absorption and/or transmission of citrus juice essential flavor/aroma oils. Additionally, it is well known that impermeable materials such as aluminum foil, polar materials (for example, polyvinylidene chlorides), and highly crystalline non-polar materials (for example, high-density polyethylene) provide varying degrees of barrier to the absorption and/or transmission of non-polar citrus juice flavor oils. However, these materials lack the requisite heat sealability over a practical temperature range. Due to the failures of these impermeable materials, past efforts have focused on using a combination of these flavor oil resistant materials with low density polyethylene as the heat-sealable component.

The existing commercial structure for a paperboard carton for juice and similar products has utilized a multi-layer structure of an easily heat-sealable barrier laminate composed of paperboard sandwiched between two layers of low density polyethylene (LDPE). The conventional structure falters in that the LDPE layer absorbs the essential oils of the juice causing integrity decay of heat seals and stress cracking of the layer. Additionally, the conventional structure provides virtually no barrier resistance to oxygen.

The coating resin of the present invention (which can be easily heat sealed) is suitable for use as a packaging material for liquids and the like. The coating resin may contain known colorants or pigments. Example of inorganic pigments are titanium dioxide, zinc flour, barium sulphate, calcium carbonate, talc, silica powder, aerosil, alumina and carbon black. Examples of organic pigments are phthalocyanine green and toluidine red.

The coating resin may also contain a leveling agent for improving the smoothness of the coated film, a defoaming agent or surfactant for preventing pin holes or cratering of the coated film, a slipping agent of improving the surface slip of the coated resin, and also a hardening catalyst and a thxotropic agent, as well as impact tougheners. The coating resin also preferably contains branching agents, as well as a decomposition scavenger, i.e. oxygen scavenger, e.g., nylon, to scavenge degradation products such as acrolein.

The coating resin of the present invention not only exhibits significant barrier properties to extend the shelf life of the juice, but the laminate containing the coating resin can be produced using conventional extrusion equipment.

Other Ingredients Added to 3GT or 3GT Copolymers:

Many other ingredients may be added to 3GT and/or 3GT copolymers of the present invention to enhance their performance characteristics. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers and the like.

Depending upon the intended end-use application, the polyester resin may contain minor amounts of other thermoplastic resins or known additives that are conventionally added to thermoplastic resins, for example, stabilizers such as ultraviolet absorbers, antistatic agents, flame retardants, auxiliary flame retardants, coloring agents such as dyes, and pigments, lubricants, plasticizers, crystallization accelerators, nucleating agents and inorganic fillers. Of course, these additives should not be employed in amounts which would adversely affect the benefits achieved by the present invention.

Inorganic fillers that may be added may be powdery or platy inorganic fillers which can be selected depending on their required duty. The powdery fillers include carbon black; graphite; silicates such as silica, quartz powder, glass beads, milled glass fiber, glass balloon, glass powder, calcium silicate, aluminum silicate, kaolin, talc, clay, diatomaceous earth and wollastonite; metal oxides such as iron oxide, titanium oxide, zinc oxide, antimony trioxide and alumina; metal sulphates such as calcium carbonate and magnesium carbonate; as well as ferrite, silicon carbide, silicon carbide, silicon nitride, boron nitride and various metal powders.

The platy fillers include mica, glass flake and metal foil. These inorganic fillers may be used either singly or in combination of two or more of them.

The inorganic or organic fillers may be used in combination with a known surface-treating agent according to the desired properties. The surface-treating agents include functional compounds such as epoxy compounds, isocyanate compounds, titanate compounds and silane compounds. These fillers may be used after having been surface-treated or they may be added together with other components in the preparation of the material.

The 3GT and 3GT copolymers of the present invention also encompass the incorporation of particular chain branching agents and chain stopping agents. Both the incorporation of the chain branching agent and solid state polymerization are believed to increase the molecular weight of the solid-state polymerized polymers and broaden the molecular weight distribution thereof. Chain branching agents suitable for use in the present invention include one or more members selected from pentaerythritol; compounds having the formula:

$R^1(OH)_k$ wherein $R^1$ is a saturated aliphatic hydrocarbon radical containing from 3 to 6 carbon atoms and .k is an integer from 3 to 6; compounds having the formula:

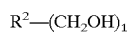

$R^2—(CH_2OH)_1$ wherein $R^2$ is a saturated aliphatic hydrocarbon radical containing from 1 to 6 carbon atoms and wherein 1 is an integer from 3 to 6.

These chain branching agents may be formed in a variety of ways which are well known to those skilled in this art.

Chain terminating agents suitable for use in the present invention must have a boiling point of above about 200° C. and must also be stable at temperatures of up to about 305° C., to avoid excessive losses at operating temperatures. A compound which is considered "stable" at temperatures of up to about 305° C. is one which undergoes no significant decomposition including decarboxylation at that temperature. Preferably, the chain terminating agents suitable for the present invention have boiling points of above about 240° C.

Other standard additives can be optionally added, such as thermal stabilizers, light stabilizers, dyes, pigments, plasticizers, fillers, antioxidants, lubricants, effusion aids, and scavengers for residual monomer or decomposition products.

We claim:

1. A non-flavor scalping, extrusion coated package, comprising:
   a. a backing layer, and
   b. a film layer extrusion coated onto at least one side of said backing layer, said film layer comprising:
      i. a polyester selected from poly(1,3 propanediol terephthalate) and a copolymer of poly(1,3 propanediol terephthalate) with up to about 20% by weight comonomers, and
      ii. a nucleation promoter selected from the group consisting of titanium dioxide, talc, amorphous silica, linear low density polyethylene, polypropylene, sodium acetate, sodium endcapped poly(ethylene terephthalate) and sodium endcapped poly(1,3 propanediol terephthalate).

2. The package of claim 1 wherein the polyester is a copolymer poly(1,3 propanediol terephthalate) and one or more comonomers selected from the group consisting of ethylene glycol, 1,4-cyclohexanedimethanol (CHDM), terephthalic acid, and isophthalic acid.

3. The package of claim 2 wherein said polyester further comprises a chain branching agent as a comonomer.

4. The package of claim 2 wherein said film layer comprises a decomposition products scavenger.

5. The package of claim 2 in the form of a carton.

6. The package of claim 2 in the form of a can or can end.

7. The package of claim 1 wherein the film layer additionally comprises one or more additives selected from the group consisting of colorants, pigments, leveling agents, defoaming agents, surfactants, slipping agents, hardening catalysts, thixotropic agents, and impact tougheners.

8. The package of claim 7 wherein said polyester further comprises a chain branching agent as a comonomer.

9. The package of claim 7 wherein said film layer comprises a decomposition products scavenger.

10. The package of claim 1 in the form of a carton.

11. The package of claim 1 in the form of a can or can end.

* * * * *